United States Patent Office

Re. 26,250
Reissued Aug. 15, 1967

26,250

ALUMINUM ORGANIC COMPLEX AND ANTI-PERSPIRANT COMPOSITIONS CONTAINING THE SAME

Samuel Grant, Glencoe, Ill., assignor to Helene Curtis Industries, Inc., Chicago, Ill., a corporation of Illinois No Drawing. Original No. 3,030,274, dated Apr. 17, 1962, Ser. No. 635,077, Jan. 18, 1957. Application for reissue June 11, 1963, Ser. No. 287,470
8 Claims. (Cl. 167—90)

Matter enclosed in heavy brackets [ ] appears in the original patent but forms no part of this reissue specification; matter printed in italics indicates the additions made by reissue.

The present invention relates to organic complex compounds of aluminum some of which are new, and to anti-perspirant and deodorizing compositions containing the same.

Aluminum compounds have found preference in the field of anti-perspirants. However, the more effective aluminum compounds generally are corrosive to clothing, and in some cases produce undesired skin irritation. Furthermore, such compounds present solubility difficulties when it is attempted to incorporate them in a rapid drying spray or aerosol composition, and if used in compositions having a high water content, they dry slowly on the skin, tend to clog the spray assembly, and are corrosive to tin lined cans.

It is an object of the present invention to provide compounds of aluminum having good solubility in alcohol, water and in chlorofluorohydrocarbons, and which exhibit good anti-perspirant and deodorizing actions.

Another object is the provision of organic compounds of aluminum having anti-perspirant and deodorant properties, and which are soluble in chlorofluorohydrocarbons and in water.

A further object is the provision of organic compounds of aluminum having anti-perspirant properties which can be dissolved in effective concentration in non-aqueous volatile solvents.

A further object is the provision of an anti-perspirant composition which can be dispensed as a rapidly drying spray which dries on the skin to a substantially invisible film.

The new compounds of the present invention comprise complex organic compounds of aluminum in which the aluminum is united to an organic ester-forming residue embodying an ether linkage, and in which the aluminum may also be bound to an alkoxy radical. By the term, "an organic ester-forming residue embodying an ether linkage," is meant an organic acid radical or an alkoxy radical, which radicals further include an ether linkage.

The compounds useful in the present invention in anti-perspirant and deodorizing compositions are white crystalline to amorphous solids, and have a pH in aqueous solution on the order of about 4.6 to 4.8. They are non-irritating to the skin and are substantially non-corrosive to fabrics. The compounds vary in solubility in water, alcohols and chlorofluorohydrocarbons, depending on the components in the molecule, and may be compounded so as to have good solubility in highly volatile organic solvents.

The compounds may be prepared by reacting aluminum trialkoxide with an ether-glycol or an ether-acid, or both, in a non-aqueous organic solvent at slightly elevated temperature, or by cooling, as required. Usually the reaction is at first exothermic so that cooling is required to maintain the desired temperature, but application of heat may be required to bring the reaction to completion. The composition of the final reaction product in any case depends on the reactants selected and their molecular ratio in the reaction mass. The reaction preferably is conducted so that the final reaction product contains the complex alkoxide and alkoxyacid compounds of aluminum with or without the ether-glycol radical in the molecule. The new compounds may be expressed in the following general formula:

$$Al\begin{cases}(OAlk)_a\\(OR)_{bv}\\(OAcOAlk)_c\end{cases}$$

wherein a or b (but not both) are zero, a is one or zero, b is one or zero, v represents the reactive valence of the OR radical, c is one or two, and a+bv+c equals 3, R represents a polyalkyleneether glycol residue in which the alkylene groups have less than five carbon atoms, (OAcOAlk) represents the acyl residue of an alkoxy carboxylic acid, and Alk represents an alkyl group of less than five carbon atoms.

The compounds of the invention are practically odorless, and they are effective as anti-perspirants and deodorants. It is believed that the deodorizing property of the compounds is due to a chelating action of the oxygen in the ether linkage, but conclusive proof of such action is lacking. The chelating action (and consequently the deodorizing action) is greatest where the aluminum complex molecule contains radicals in which an electron receptive oxygen atom is adjacent an atom capable of imparting electrons thereto, such as radicals having oxygen on adjacent carbon atoms, or having oxygen on a carbon atom adjacent a carbon atom linked by a double bond. The compounds of this invention are less liable to hydrolysis than aluminum isopropoxide acetate (which is known) and leave little odor on hydrolysis. Because of the amorphous form of the compounds, evaporation of the solvent produces a thin substantially continuous film on the skin rather than a crystalline residue. However, the crystalline compounds may be employed preferably in admixture with a water insoluble organic liquid of high volatility as a plasticizer or dispersant.

The preferred starting material is aluminum triisopropoxide, but depending on the solvent employed, aluminum triethoxide, or other alkoxides of aluminum may be used. The preferred alkoxy acid is methoxyacetic acid, but other soluble alkoxy acids, such as ethoxyacetic acid, ethoxypropionic acid, and the like may be employed. The preferred polyalkylene-etherglycol employed is dipropyleneglycol, but other such compounds, for example, diethyleneglycol, triethyleneglycol, dibutyleneglycol and the like may be employed.

The concentrations of reactants preferably are selected so that the final reaction product is a solution of the desired aluminum compounds, preferably in a mixed solvent consisting of the initial solvent employed plus the alcohol or polyethyleneglycol liberated in the reaction. This reaction mixture may be compounded with other desired ingredients and diluted with the desired solvent to the final desired concentration, so that isolation of the complex aluminum compound from the reaction mixture becomes unnecessary for preparing an anti-perspirant.

The invention is illustrated by the following specific examples:

EXAMPLE 1

To a solution of 204 grams (1 mole) pulverized aluminum triisopropoxide dissolved in 750 grams "Freon 113" (or "Freon 11," if preferred) is slowly added 134 grams (1 mole) dipropyleneglycol $(CH_3CHOHCH_2)_2O$. The mixture is maintained at about 60° F. for one hour. The product of the reaction is aluminum monoisopropoxide di(propyleneglycolate) dissolved in a mixture of "Freon" and isopropyl alcohol.

"Freon 113" is the trademark for trichlorotrifluoroethane. "Freon 11" is the trademark for trichlorofluoromethane.

EXAMPLE 2

To the reaction mixture, produced according to Example 1, is added 90 grams (1 mole) methoxyacetic acid, the mixture being cooled to maintain the temperature at about 60° F. The product of the reaction is aluminum dipropyleneglycolate monomethoxyacetate of the probable formula

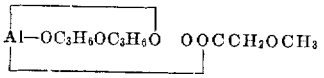

In the above example, by varying the molecular ratio of the alkoxyacetic acid or polyalkyleneglycol, mixtures containing corresponding molecular ratios of the reactants can be produced. In general, it is preferred to have in the final aluminum complex molecule two-thirds of the valences satisfied by the substituent or substituents containing an ether linkage.

EXAMPLE 3

204 grams (1 mole) pulverized aluminum triisopropoxide, $Al(OC_3H_7)_3$, is added slowly with stirring to a mixture of 180 grams (2 moles) methoxyacetic acid in 384 grams (6.4 moles) absolute alcohol in a flask equipped with a reflux condenser. The temperature is then maintained about 110° F. for about two hours by cooling or heating as required. The reaction mixture is then filtered and the filtrate consists of a 35% solution of aluminum isopropoxide dimethoxyacetate in a mixture of ethyl and isopropyl alcohols.

In the above reaction the quantity of absolute alcohol initially employed may be varied between about 2.25 to 6.4 moles. At the lower alcohol proportions the reaction mass becomes difficult to filter, but it may be employed without filtration if desired, to produce an anti-perspirant.

EXAMPLE 4

To 12 grams of the reaction product produced in Example 2 is added 13 grams ethyl alcohol, 0.1 gram Actamer, perfume, and about 75 grams of mixed "Freon 11" and "Freon 12" (85/15 ratio). The mixture is packaged in a container capable of withstanding pressure and equipped with a manually operated non-clogging valve, or one capable of being washed in water, to provide a spray dispensed anti-perspirant.

In the above example part of the "Freon 11" may be replaced by alcohol, up to about 80 to 85% alcohol in the composition and about 20–15% "Freon 11."

EXAMPLE 5

17 grams of the reaction product produced according to Example 3, consisting of a 35% solution of aluminum isopropoxide dimethoxyacetate in ethyl and isopropyl alchols, is mixed with 9 to 14 grams absolute alcohol and 65 to 70 grams "Freon 11 and 12" (75/25 ratio), adding perfume as desired. If desired, a bacteriostat, such as "Actamer" or "G11" may be included, and there may also be included if desired a dispersant or wetting agent, and a high boiling organic ester, such as dimethylphthalate, isopropyl palmitate or butyl stearate. The mixture is an anti-perspirant composition suitable for use in aerosol dispensers. This composition is not corrosive to tinned metal cans used commercially for aerosol sprays.

In the above example by using 77.5 grams absolute alcohol and omitting the "Freon" a composition is provided which may be dispensed as a spray from a polyethylene squeeze bottle.

"Actamer" is the trade [name] *mark* for [22'] *2,2'*-thiobis (4,6-dichlorophenol) and "G11" is the trade

[name] *mark* for dihydroxyhexachloro diphenylmethane.

The invention claimed is:

1. An organic aluminum compound of the following empirical formula:

$$Al(OR)_a(OAcOAlk)_b$$

wherein a and b are numbers including fractions, neither of which is zero, [and b minus 2a equals three] *b being less than 3, and such that 3 minus b equals a,* R represents a polyalkylene-ether glycol residue of the type, alkylene-O-alkylene-O, in which the alkylene groups have less than five carbon atoms, and OAcOAlk represents the acyl residue of a water soluble alkoxycarboxylic acid, in which Alk represents an alkyl group of less than five carbon atoms.

2. An organic aluminum compound of the following empirical formula:

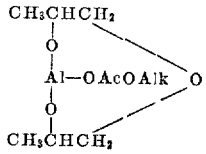

wherein AcOAlk represents the acyl residue of a water soluble alkyl ether carboxylic acid having less than five carbon atoms in the alkyl group.

3. An organic aluminum compound of the following empirical formula:

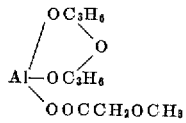

4. A composition useful as an anti-perspirant comprising an aluminum compound as defined in claim 1 dissolved in an organic liquid.

5. A composition as specified in claim 4 wherein the organic liquid is hydrophobic.

6. A composition as specified in claim 4 wherein the organic liquid is volatile at low temperatures.

7. A composition as specified in claim 6 wherein the organic liquid is a lower aliphatic alcohol.

8. A composition as specified in claim 4 wherein the organic liquid is a mixture of a volatile alcohol and a chlorofluorohydrocarbon.

References Cited

The following references, cited by the Examiner, are of record in the patented file of this patent or the original patent.

UNITED STATES PATENTS

| | | | |
|---|---|---|---|
| 2,044,968 | 6/1936 | Bruson | 260—448 |
| 2,087,162 | 7/1937 | Moore | 167—90 |
| 2,210,013 | 8/1940 | Teller | 167—90 |
| 2,327,815 | 8/1943 | Niedercorn et al. | 260—448 |
| 2,480,743 | 8/1949 | Krantz et al. | 260—448 |
| 2,522,641 | 9/1950 | Schmerling et al. | 260—448 |
| 2,744,074 | 5/1956 | Theobald | 260—448 |
| 2,801,190 | 7/1957 | Orthner et al. | 260—448 |
| 2,877,248 | 3/1959 | Reuter et al. | 260—448 |

FOREIGN PATENTS

| | | |
|---|---|---|
| 731,216 | 6/1955 | Great Britain. |

OTHER REFERENCES

Webster's New International Dictionary, 2nd edition, 1941, p. 950.

ALBERT T. MEYERS, *Primary Examiner.*

JULIAN S. LEVITT, *Examiner.*

ANNA P. FAGELSON, *Assistant Examiner.*